(12) United States Patent
Van Heygen

(10) Patent No.: US 6,701,870 B1
(45) Date of Patent: Mar. 9, 2004

(54) ANIMAL HABITAT

(76) Inventor: Emmanuel Van Heygen, Winketkaai 16, 2800 Mechelen (BE)

( * ) Notice: Subject to any disclaimer, the term of this patent is extended or adjusted under 35 U.S.C. 154(b) by 0 days.

(21) Appl. No.: 10/321,733

(22) Filed: Dec. 17, 2002

(51) Int. Cl.[7] .................................................. A01K 1/00
(52) U.S. Cl. ........................................ 119/452; 119/473
(58) Field of Search ................................. 119/452, 473, 119/6.5, 246, 469, 470; D30/102, 107

(56) References Cited

U.S. PATENT DOCUMENTS

| | | | |
|---|---|---|---|
| 4,234,780 A | | 11/1980 | McCarthy |
| 4,318,945 A | | 3/1982 | Goldman et al. |
| 4,708,089 A | | 11/1987 | Goldman et al. |
| 5,261,352 A | | 11/1993 | Stammelman |
| 5,406,054 A | | 4/1995 | Chirdon |
| 5,493,997 A | * | 2/1996 | Ritchey ...................... 119/428 |
| 5,778,824 A | | 7/1998 | Musgrave et al. |
| 5,791,293 A | | 8/1998 | Northrop et al. |
| 5,857,430 A | | 1/1999 | Griffiths |
| 6,314,912 B1 | * | 11/2001 | Armbruster ................. 119/428 |

* cited by examiner

Primary Examiner—Charles T. Jordan
Assistant Examiner—Kimberly S. Smith
(74) Attorney, Agent, or Firm—Wolf, Greenfield & Sacks, P.C.

(57) ABSTRACT

An animal habitat for use within a terrarium or aquarium with at least one transparent side wall consisting of a simulated rock having two portions that have corresponding faces that register with one another for visually creating an image of a single rock. The faces are flat enabling them to be positioned in registration with one another on opposite sides of the terrarium transparent side wall. The animal habitat includes a habitat cavity for one or more animals in one portion of the rock to be placed inside the terrarium with the cavity open to the flat face for enabling a party outside of the terrarium wall to view the cavity and any animals disposed therein. Magnetically attracting components are disposed in each portion of the rock for releasable holding the two portions in registration with one another on opposite sides of the transparent side wall of the terrarium. An access to and from the cavity from outside of the rock is provided in one portion of the rock surface other than the flat face. The animal habitat is insulated to provide a cooler temperature within the habitat compared to the terrarium temperature and the moisture content of the air within the animal habitat can be increased with the addition of moistened moss or substrate inside of the animal habitat.

8 Claims, 4 Drawing Sheets

ANIMAL HABITAT

BACKGROUND OF INVENTION

Field of Invention

This invention relates to terrariums and aquariums, and in particular to an animal habitat suitable for use within a transparent-walled terrarium. In general, terrariums are containers in which small land animals are kept and observed. Most terrariums have glass walls to enable one to easily view the animals in it. The present invention enables animals such as reptiles and amphibians to be observed in a confined space such as a cave normally for resting or sleeping. The prior art fails to allow one to observe an animal in such a setting, without disturbing the animals in the process. The disturbance can cause stress for the animals, and it also disrupts the ability to observe the animal in its natural state.

SUMMARY OF INVENTION

The present invention is embodied in a structure preferably in the shape of an object that appears in nature, such as a rock, mound of earth, tree stump, etc. The structure is divided into at least two portions having flat complimentary faces that match one another so that when the two portions are oriented face to face they together simulate the structure in unitized form. When used inside a terrarium or aquarium, one portion is ordinarily placed on a surface of the terrarium such as the terrarium floor, with the flat complimentary surface flush against a transparent terrarium wall, and the other portion is placed with its complimentary surface on the outside of the same terrarium wall so that the two complimentary surfaces register with one another to create the appearance of the unitized structure. A cavity is provided in the portion within the terrarium, which cavity is open to the complimentary surface, and a passage is also provided in that portion enabling animals to move in and out of the cavity. The two portions of the structure are releasably held in registration with one another by magnetic force, and when it is desired to view the animals in the cavity, the observer needs only to remove the outer portion to expose the cavity through the transparent terrarium wall.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing.

The objects, advantages and features of this invention will be appreciated from the following detailed description, when taken in conjunction with the accompanying drawings in which.

LIST OF COMPONENTS

Figure 1:
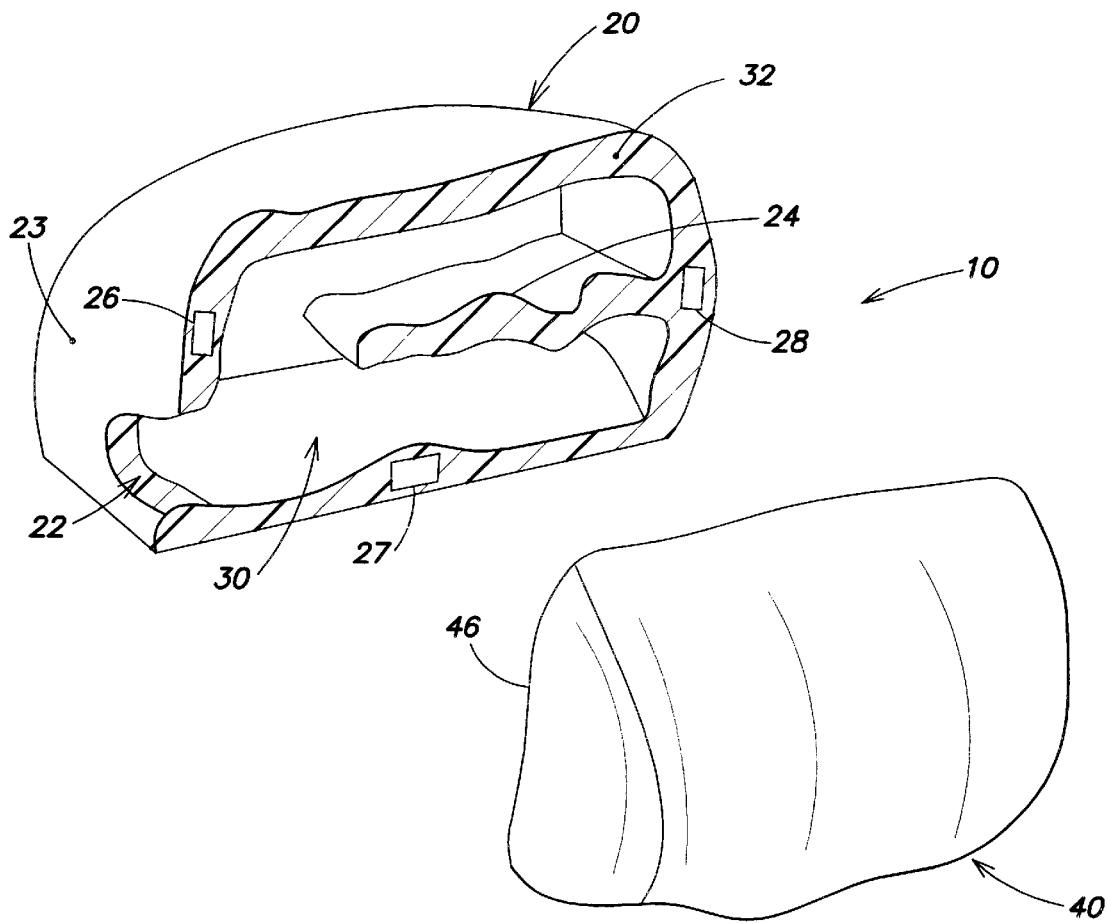
FIG. 1 is an exploded perspective view of one embodiment of the animal habitat in accordance with this invention, illustrating the inside of the interior portion thereof.

10—Animal Habitat
20—interior portion of Animal Habitat
22—reptile entrance
23—side wall of interior portion
24—ledge
26—magnet
27—magnet
28—magnet
30—habitat cavity
32—flat face of interior portion
40—exterior portion of Animal Habitat
42—magnet
43—magnet
44—magnet
46—flat face of exterior portion
60—terrarium
61—terrarium floor
62—terrarium wall
64—reptile

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

Figure 3A:
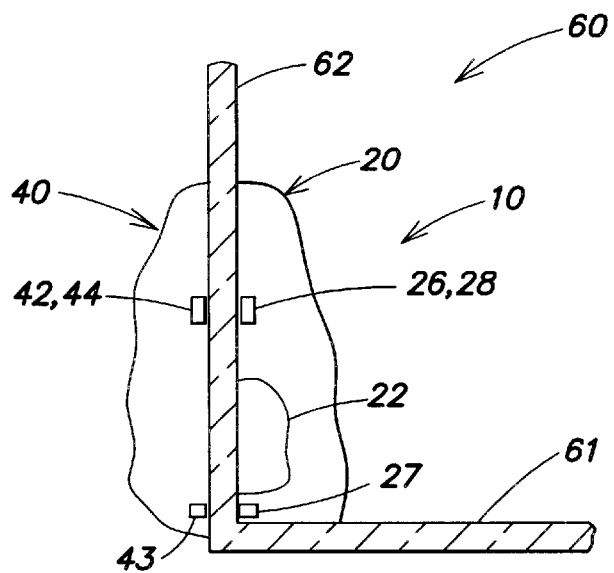
FIGS. 3A and 3B are cross-sectional views of the animal habitat assembled on a terrarium wall shown respectively with and without the exterior portion in place.
Figure 3B:
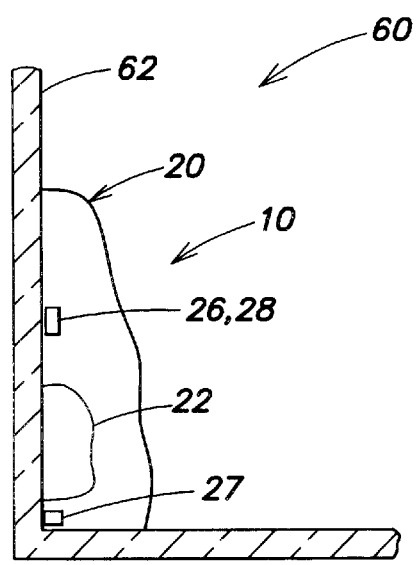

The invention is an animal habitat that allows one to observe a reptile or amphibian in a terrarium, without disturbing the animal or causing stress to it. The drawings show a preferred embodiment, wherein the habitat 10 includes an interior portion 20 and an exterior portion 40, that register with one another to visually create the image of a single rock. The interior portion 20 is normally located within a terrarium 60, while the exterior portion 40 is positioned outside of the terrarium (see FIGS. 3A and 4). The two portions 20 and 40 have corresponding faces 32 and 46, respectively, that register with one another on opposite sides of the flat, transparent terrarium wall 62. The two portions 20 and 40 are preferably made of polyresin.

The interior portion 20 is positioned on the terrarium floor 61 or on any other suitable surface within the terrarium. The interior portion 20 includes a hollowed out habitat cavity 30 that can accommodate one or more small animals while sleeping or awake. The habitat cavity 30 is open to the face 32 enabling a party to view the cavity and any animals disposed therein when that face is exposed. When face 32 abuts against the terrarium wall 62 and that wall is not obstructed, a party observing the terrarium from the outside can see into the cavity and view the animals inside.

Figure 4:
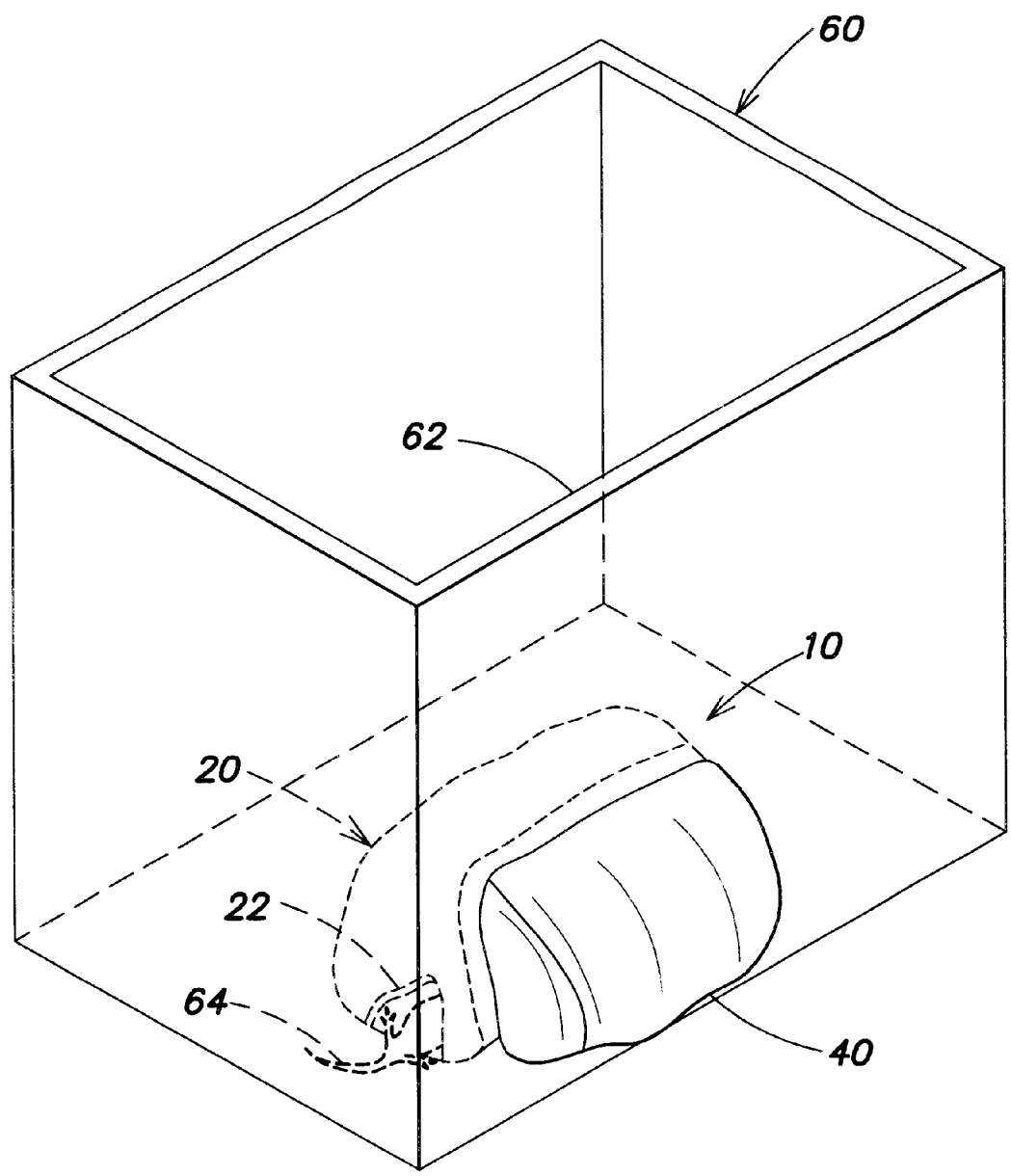
FIG. 4 is a perspective view showing the animal habitat attached to a terrarium with both portions thereof in position.

In a preferred embodiment, the flat face of the interior portion 32 carries at least one magnet. The figures illustrate three magnets 26–28 spaced around the edge of the flat face 32. As described more fully below the magnets cooperate with magnets 42–44 correspondingly placed in the face 46 of the exterior portion 40 to hold the exterior portion in alignment with the interior portion when the portions are aligned on opposite sides of the terrarium wall 62 as shown in FIG. 4.

An entrance 22 to the cavity is shown in the embodiment illustrated, located on the side wall 23 of the interior portion 20 to enable a reptile to enter and leave the cavity 30. The entrance may be located on any part of the interior portion 20 but preferably is within easy viewing from outside the terrarium. In the preferred embodiment shown in the drawing, the entrance is in part defined by the terrarium wall 62 so that an animal can be observed as it enters and leaves the cavity 30 through the entrance 22 when the outer portion 40 is removed.

Within the cavity 30 of the animal habitat 10, is a ledge 24. The ledge 24 forms a tunnel system in the cavity that can be of any shape and size. The ledge 24 extends out from the interior walls of the cavity preferably to the plane of the face 32 and divides the interior cavity into separate but connected upper and lower chambers.

Figure 2:
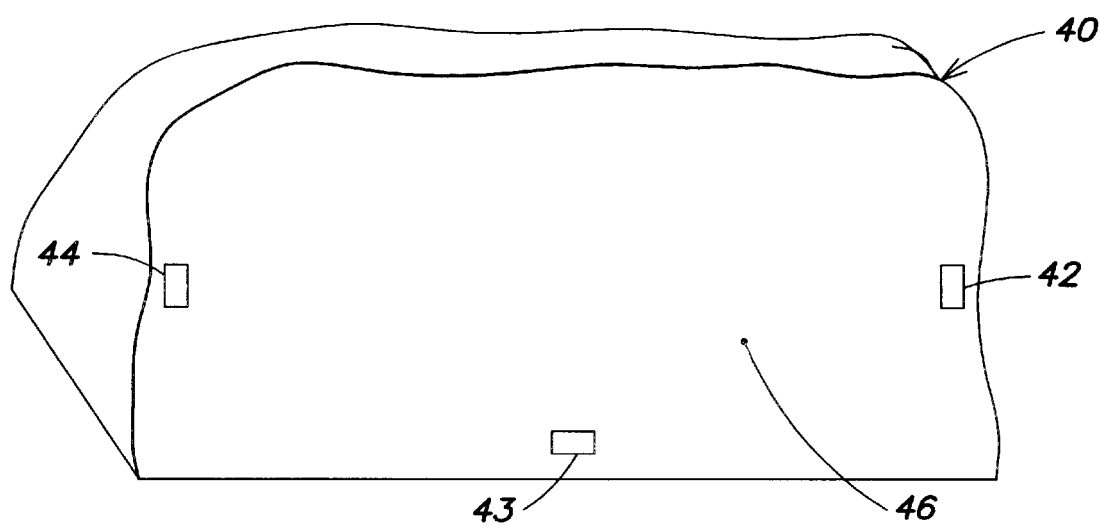
FIG. 2 is a rear perspective view of the exterior portion of the animal habitat.

The exterior portion 40 acts as a cover to the reptile den. The exterior portion 40 is placed outside of the terrarium 60 flush with the terrarium wall 62. The flat face 46 of the exterior portion registers with the flat face 32 of the interior portion 20 through the glass terrarium wall 62. In a preferred embodiment, there is at least one magnet located on the flat face of the exterior portion 46 to interact with a magnet in the face 32 of the interior portion. FIG. 2 shows three magnets, 42–44 spaced around the outer edge of the flat face 46, that align with magnets, 26–28 on the flat face of the interior portion. The magnetic force releasably holds the exterior portion 40 in alignment with the interior portion 20, through the transparent terrarium wall 62. This feature advantageously allows the reptiles and amphibians to be observed while in their hiding or sleeping spot when the exterior portion 40 is removed from wall 62. Additionally, the invention enables a party to observe the animal without having to open the terrarium. Opening the terrarium causes undesirable stress on the animal. The invention thus eliminates this stress factor.

An alternative embodiment of the invention includes at least one magnet only on either the interior portion 20 or the exterior portion 40. The remaining portion contains a magnetically attracted material that registers with the magnet on the opposite portion. Moreover, the present invention is not limited to magnets on both the interior portion 20 and the exterior portion 40.

Another feature of the invention is that the reptile cave is insulated to maintain a temperature within the cave cooler than the ambient temperature in the terrarium. To satisfy higher moisture requirements, moistened moss or substrate can be placed inside the cave.

The drawings show the reptile den constructed to visually create the image of a rock. This design adds to the décor of the terrarium and it maintains the natural surrounding of the terrarium. While this shape has those desirable effects, it is within the scope of the invention to include a reptile den of different shapes and sizes, such as a rock, a mound of earth, tree stump etc. Further, the illustrated embodiment allows a party to view all areas of the animal cavity. In other embodiments a portion of the cavity may not be visible from outside the terrarium wall even when the outer portion is removed. Moreover, the invention also encompasses embodiments wherein portions of the animal cavity are visible from outside the terrarium wall even when the exterior portion 40 of the structure is in its operative position in registration with the interior portion 20, that is, when the exterior portion does not fully cover the open face of the interior portion.

As previously stated, the animal habitat 10 can also be used with an aquarium. Similar to use with a terrarium, the habitat 10 can be put inside of an aquarium for observing fish and other aquatic animals inside the habitat.

An alternative embodiment of the invention makes the terrarium an unnecessary accessory to the invention. Rather than require a transparent terrarium wall between the interior portion and exterior portion of the above described invention, an alternative embodiment may have a transparent closure covering the face 32 of the interior portion 20 and disposed between the two portions. By removing the exterior portion 40 the cave and animals in it may be viewed. This enables the structure to be used outside or independent of a terrarium. This embodiment has the added feature of increased portability.

In summary, the present invention allows easy observation of reptiles and amphibians while in their hiding or sleeping spot without opening the terrarium and disturbing them. When the exterior portion is attached, most if not all the cavity within the habitat is hidden from outside of the terrarium. This allows the animals to hide or sleep within the dark space of the cavity, undisturbed. Removal of the exterior portion enables a party to view the animals within the cavity in a less stressful natural environment.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only, and the scope of the invention is limited by the appended claims and their equivalents.

What is claimed is:

1. An animal habitat for use in a terrarium with at least one transparent side wall comprising, a simulated rock having two portions that have corresponding faces that register with one another for visually creating an image of a single rock, each of said faces being flat for enabling the flat faces to be positioned in registration with one another on opposite sides of the terrarium transparent side wall, a habitat cavity for one or more animals in the one portion of the rock to be placed inside the terrarium and with the cavity open to the flat face thereof for enabling a party outside the terrarium wall to view the cavity and any animals disposed therein when the flat face is disposed against an inside surface of the transparent side wall and the other portion of the rock is out of registration therewith so as not to block viewing of the cavity through said wall, and magnetically attracting components disposed in each portion of the rock for releasably holding the two portions in registration with one another on opposite sides of the transparent side wall of the terrarium.

2. An animal habitat as described in claim 1 wherein, an access to and from the cavity from outside the rock is provided in said one portion of the rock on a surface of the rock other than through the flat face thereof.

3. An animal habitat as described in claim 1 wherein, the animal habitat is insulated to provide a habitat temperature cooler than the ambient temperature within the terrarium.

4. An animal habitat as described in claim 1 wherein, a moisture producing means, such as a moistened moss or substrate increases the moisture content of the air in the animal habitat when placed inside of the animal habitat.

5. An animal habitat as described in claim 1 wherein, at least one of the magnetically attracting components is a magnet.

6. An animal habitat for use in an aquarium with at least one transparent side wall comprising, a simulated rock having two portions that have corresponding faces that register with one another for visually creating an image of a single rock, each of said faces being flat for enabling the flat faces to be positioned in registration with one another on opposite sides of the aquarium transparent side wall, a habitat cavity for one or more animals in the one portion of the rock to be placed inside the aquarium and with the cavity open to the flat face thereof for enabling a party outside the aquarium wall to view the cavity and any animals disposed therein when the flat face is disposed against an inside surface of the transparent side wall and the other portion of the rock is out of registration therewith so as not to block viewing of the cavity through said wall, and magnetically attracting components disposed in each portion of the rock for releasably holding the two portions in registration with one another on opposite sides of the transparent side wall of the aquarium.

7. An animal habitat for use in a terrarium with at least one transparent side wall comprising, a body having two portions that have corresponding faces that register with one another, each of said faces being flat for enabling the flat faces to be positioned in registration with one another on opposite sides of the terrarium transparent side wall, a habitat cavity for one or more animals in the one portion of the body to be placed inside the terrarium and with the cavity open to the flat face thereof for enabling a party outside the terrarium wall to view the cavity and any animals disposed therein when the flat face is disposed against an inside surface of the transparent side wall and the other portion of the body is out of registration therewith so as not to block viewing of the cavity through said wall, and magnetically attracting components disposed in each portion of the body for releasably holding the two portions in registration with one another on opposite sides of the transparent side wall of the terrarium.

8. An animal habitat as described in claim 7, wherein each portion of the body visually creates an image of a rock.

\* \* \* \* \*